United States Patent [19]

Morris, Jr. et al.

[11] Patent Number: 5,217,770

[45] Date of Patent: Jun. 8, 1993

[54] BRAIDED SHAPED FILAMENTARY STRUCTURES AND METHODS OF MAKING

[75] Inventors: Edward L. Morris, Jr.; Ronnie S. Liew, both of Pueblo, Colo.

[73] Assignee: The B. F. Goodrich Company, Akron, Ohio

[21] Appl. No.: 746,267

[22] Filed: Aug. 15, 1991

[51] Int. Cl.$^5$ ............................................. B29D 22/00
[52] U.S. Cl. .................................. 428/36.3; 28/107; 28/110; 28/142; 29/419.1; 87/8; 87/9; 156/148; 188/71.5; 428/225; 428/234; 428/293; 428/294; 428/300; 428/402; 428/902
[58] Field of Search ............... 428/234, 902, 300, 225, 428/293, 294, 408, 36.3; 28/107, 110, 142; 156/148; 87/8, 9; 29/419.1; 188/71.5; 192/107 M

[56] References Cited

U.S. PATENT DOCUMENTS

| | | | |
|---|---|---|---|
| 3,007,497 | 11/1961 | Shobert | 138/125 |
| 3,657,061 | 4/1972 | Carlson et al. | 161/81 |
| 4,018,482 | 4/1977 | Rastogi et al. | 301/6 E |
| 4,613,017 | 9/1986 | Bok | 188/71 |
| 4,621,662 | 11/1986 | Olry | 138/129 |
| 4,657,795 | 4/1987 | Foret | 428/36.3 |
| 4,775,566 | 10/1988 | Landry | 428/288 |
| 4,790,052 | 12/1988 | Olry | 28/110 |
| 4,878,563 | 11/1989 | Baden et al. | 188/71 |
| 4,946,722 | 8/1990 | Moyer | 428/36.3 |
| 4,955,123 | 9/1990 | Lawton et al. | 29/419.1 |
| 5,052,446 | 10/1991 | Gysin | 428/36.3 |
| 5,081,754 | 1/1992 | Lawton et al. | 29/419 |

FOREIGN PATENT DOCUMENTS

| | | |
|---|---|---|
| 0424989A1 | 1/1987 | European Pat. Off. . |
| 0232059A2 | 12/1987 | European Pat. Off. . |
| 2911762 | 10/1980 | Fed. Rep. of Germany . |
| 2012671B | 6/1982 | United Kingdom . |
| 2099365A | 12/1982 | United Kingdom . |

*Primary Examiner*—James J. Bell
*Attorney, Agent, or Firm*—David M. Ronyak

[57] ABSTRACT

Fibrous substrates for the production of carbon and/or ceramic (including mixtures of these) fiber reinforced carbon and/or ceramic (including mixtures of these) composites and to methods of manufacture of same. A shaped filamentary structure comprising at least a first braided filamentary tape layer of a width generally corresponding to that of the filamentary structure to be formed, the first braided filamentary tape layer superposed upon and joined to least one other filamentary layer by needlepunching to produce cross-linking of the layers by filaments displaced out of the layers and extending in a direction generally perpendicular to the faces of the layers, and methods of making same. The structure may include a plurality of hellically wound braided tapes arranged to form a flat, hollow annulus having a plurality of interleaved braided layers. The structure may be used in the production of friction discs.

26 Claims, 5 Drawing Sheets

BRAIDED SHAPED FILAMENTARY STRUCTURES AND METHODS OF MAKING

This invention relates to fibrous substrates for the production of carbon and/or ceramic (including mixtures of these) fiber reinforced carbon and/or ceramic (including mixtures of these) composites and to methods of manufacture of same.

Exemplary of such a composite is a carbon fiber/carbon matrix brake disc made by depositing a carbon matrix on a carbon fiber substrate of the invention, the fibrous material of the substrate being carbonized to reinforce the carbon matrix with carbon fibers. Deposition of carbon on the substrate is effected by in situ cracking of a carbon bearing gas (hereinafter referred to as carbon vapor deposition, abbreviated "CVD" or carbon vapor infiltration, abbreviated "CVI", as these terms are used interchangeably for purposes of the present invention) or by repeatedly impregnating the substrate with a carbon bearing resin and thereafter charring such resin or a combination of such methods to densify the carbon matrix on the carbonized substrate. The invention is not directed to formation of the carbon matrix or densification of the carbon fiber substrate, but rather to the substrate, its preparation, and subsequent densification in known manner to provide a carbon fiber reinforced composite, especially one suitable for use as a friction disc in a brake or clutch.

Substrates according to the invention may be prepared from virgin or recycled fiber derived from composites or preforms formed from carbon fiber or a precursor of carbon fiber.

A preferred material for use in the invention is polyacrylonitrile (PAN) fiber which, particularly if CVD is to be employed, is preferably in an oxidized condition which facilitates subsequent carbonization. Greige PAN fiber and carbon fiber or graphite fiber may also be found to be suitable. Oxidized PAN fiber (which may hereinafter be referred to as "OPF") is available commercially in various forms, including tows, yarns, woven and non-woven fabrics, knit fabrics and felts. For the present invention, the preferred starting form is OPF tow. Suitable 12k tows may be obtained from Zoltek of Bridgeton, Mo., RKT of Muir of Ord, Scotland. Tows and/or yarns of PAN fibers, carbon fibers, graphite fibers, ceramic fibers, precursors of carbon fibers and precursors of ceramic fibers, and mixtures of these may be used. As used herein the term "tow" is used to refer to a continuous strand of continuous filaments. As used herein the term "yarn" is used to refer to a continuous strand of continuous or staple fibers or blends of these; thus the term "yarn" encompasses tow. Continuous fiber is generally preferred over discontinuous fiber due to enhanced mechanical properties in the resultant composite product.

In certain known processes for the manufacture of carbon fiber reinforced friction discs, such as brake discs employed on aircraft, annuli are cut out of parallel-sided sheets of PAN fiber material to form one or more substrate annuli. If the parallel-sided PAN sheet material is not of sufficient thickness, two or more such annuli are stacked and joined by needlepunching to form a friction disc substrate or preform. This procedure results in considerable wastage of expensive PAN or OPF sheet and the offcut material cannot be reprocessed to continuous filament form to make a new continuous filament sheet.

While there are known processes for recycling offcut PAN sheet waste material (such as that described in GB 2 012 671A which describes a process for recycling PAN sheet material by chopping it into staple fibers and thereafter forming a new fabric sheet by needlepunching a layer of carded (recycled) staple fibers to a substantially unidirectional array of continuous filaments extending transversely to the average direction of the carded staple fibers, from which reformed sheet material annuli are again cut out and the off-cut fabric sheet material may again be recycled), it remains desired to utilize a process for conversion of PAN or OPF tow into a near net shape friction disc preforms which does not generate such offcut material.

One approach to reduce wastage of expensive PAN sheet material in the production of preforms to be used in production of discs for aircraft braking systems is described in EP publication 0 232 059 A2 to Smith. According to Smith, a shaped filamentary structure is prepared in the following manner: needlepunching a unidirectional layer of filaments to provide a degree of dimensional stability; cutting a plurality of segments from the layer of needlepunched material; assembling a plurality of such segments in side-by-side contiguous relationship to produce a filamentary layer of the required structural shape; superposing at least one similar layer on the first layer; and needlepunching the superposed layers to assemble and join the segments. The purpose of cutting segments from the dimensionally stable layer and assembling those segments side-by-side to produce a structural shape is to reduce wastage of the material because it is possible to lay out the segmental shapes to enable maximum use of filamentary material.

U.K. Patent 2 099 365B to Chareire et al discloses a another process for the production of friction discs of carbon/carbon composite material by winding a strip of material comprising carbon or carbon precursor fibers, the strip comprising two or more layers of fibers having different orientations, around a cylindrical mandrel followed by carbonization and/or densification. At the same time as the strip of fibrous material is wound around the mandrel, it is subjected to a radial needlepunching operation. The resulting roll is cut up perpendicularly to its axis to form a large number of disc members if the width of the strip is sufficient for the purpose. U.S. Pat. No. 3,657,061 to Carlson et al discloses a carbon/carbon composite formed by needlepunching several layers of fibrous material in a form of woven cloth, sheets, strip, yarn or as individual carbon or graphite fibers to position some of the fibers of each layer into a running direction substantially perpendicular to the running direction of the layers. After carbonizing the article is machined to final dimensions.

U.S. Pat. No. 4,621,662 to Olry discloses a process and apparatus for manufacturing axi-symmetrical three-dimensional structures such as (rocket) nozzle exit cones, by winding onto a rotary mandrel having a shape corresponding to that of the structure to be manufactured, a tape of fibrous material having a width several times less than the length of the generatrix of the structure to form superposed layers, each layer being formed by successive turns of the tape, and during winding successively bonding the layers together by needlepunching at the place where the tape is superposed on the mandrel on the previously formed layer.

It is apparent from the foregoing that there remains a need for a process for forming fibrous preforms, particularly for the manufacture of friction discs, which efficiently utilizes expensive and difficult to handle OPF filaments and carbon or graphite fibers.

It is an object of the present invention to reduce substantially the amount of wastage due to off-cut material when forming fibrous preforms to be used in the manufacture of friction discs.

It is a further object of the invention to provide a near net shape annular friction disc preform thus resulting in less wastage of expensive fiber.

It is a further object of the invention to provide a braided needlepunched structure which offers improved mechanical properties compared to certain known structures.

It is still a further object of the invention to provide a braided needlepunched structure which is circumferentially continuous and circumferentially homogenous.

According to an aspect of the invention there is provided a method of producing a shaped filamentary structure comprising the steps of forming a braided filamentary tape of a width generally corresponding to that of the filamentary structure to be formed; superposing at least one filamentary layer on a layer of such braided filamentary tape; needlepunching the superposed layers to produce cross-linking of the layers by filaments displaced out of the layers and extending in a direction generally perpendicular to the faces of the layers.

According to another aspect of the invention there is provided a shaped filamentary structure comprising at least a first braided filamentary tape layer of a width generally corresponding to that of the filamentary structure to be formed, the first braided filamentary layer superposed upon and joined to at least one other filamentary layer by needlepunching to produce cross-linking of the layers by filaments displaced out of the layers and extending in a direction generally perpendicular to the faces of the layers.

The above and other features and advantages of the invention will become more apparent when considered in light of the following description of preferred embodiments of the invention in conjunction with the accompanying drawings which also form a part of the specification.

DETAILED DESCRIPTION OF PREFERRED EMBODIMENTS

Figure 1:
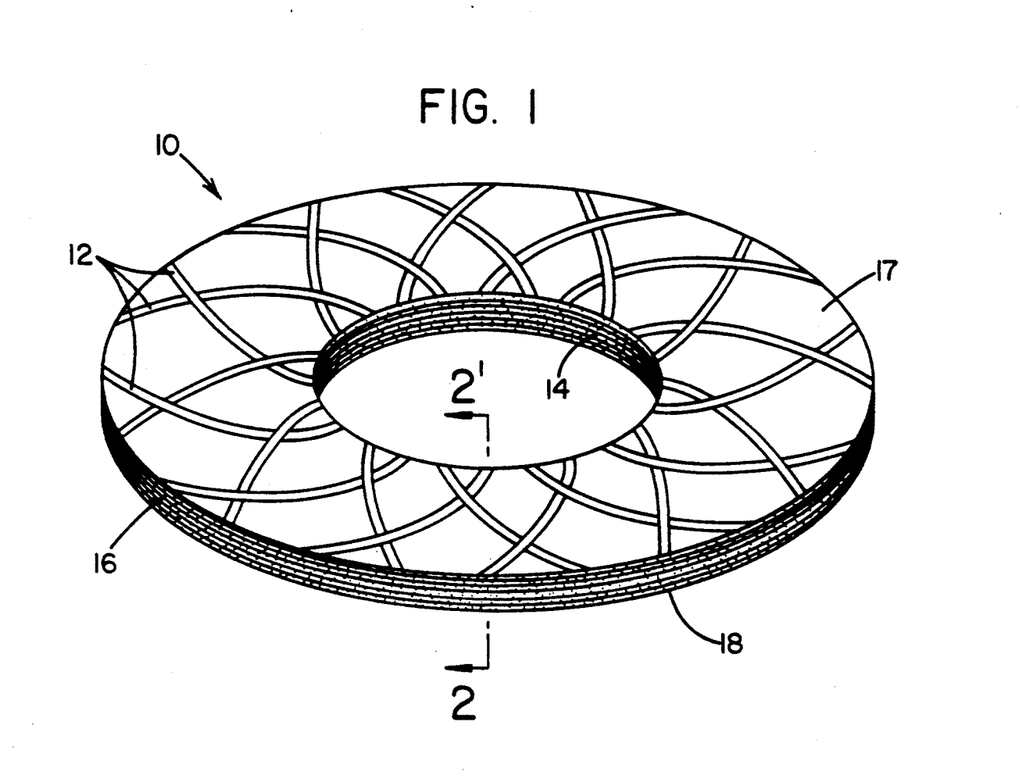
FIG. 1 is an isometric view of a braided friction disc according to the invention.

Referring to FIG. 1, friction disc 10 is formed of superposed layers of braided curved tapes formed of tows 12 of OPF cross-linked to one another by needlepunching to consolidate and densify the disc, which is further densified thereafter by carbon matrix deposition using conventional CVI processes. In other embodiments, the cross-linked layers may have deposited thereon a matrix of carbon, ceramic, precursor of carbon, precursor of ceramic, and mixtures of these to further bind together the cross-linked layers.

Due to the braided structure of friction disc 10, each of the OPF tows 12 within the disc 10 is substantially continuous (except to the extent it has been severed by machining the inner and outer cylindrical peripheral surfaces 14, 16 of the disc or its flat, parallel wear faces 17, 18) and passes in periodic manner over and under other tow members forming the braid and from the outside periphery 16 to the inside periphery 14 of the disc 10 as it extends circumferentially about the disc. Continous fiber is generally preferred over discontinuous fiber due to higher mechanical properties in the resultant composite friction disc product.

Figure 7:
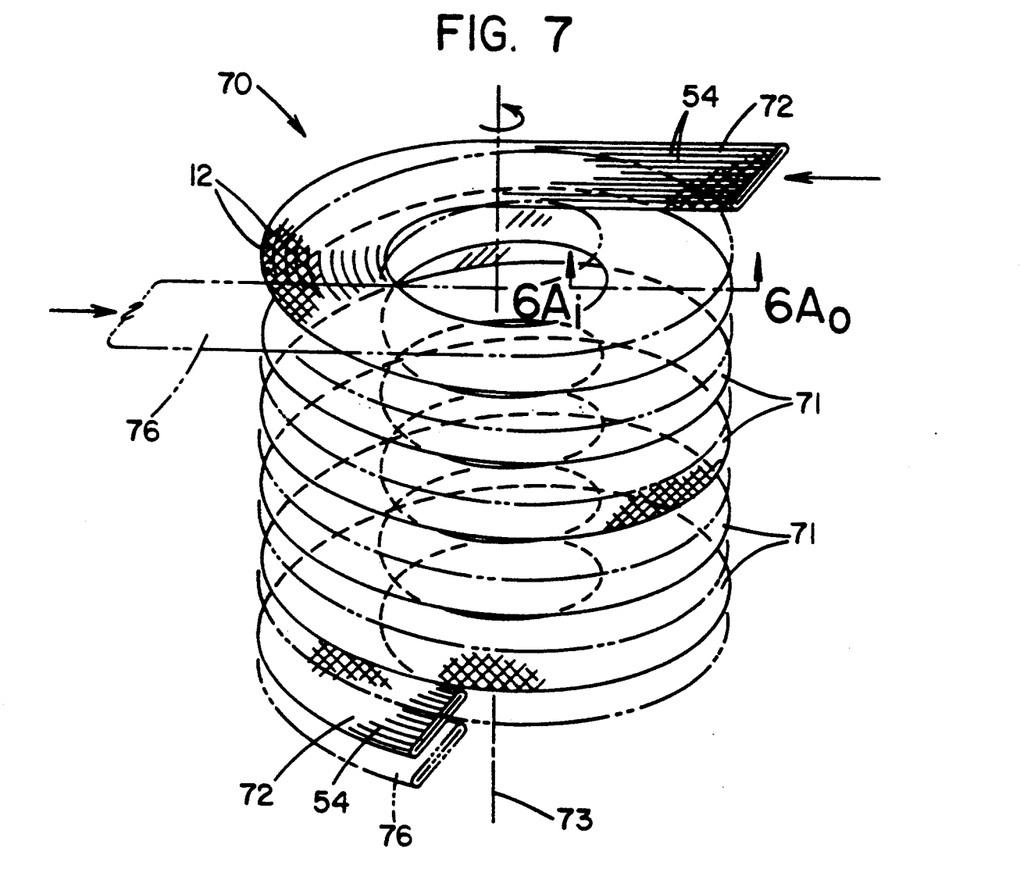
FIG. 7 is an exploded schematic view of an embodiment of a continuous braided helical preform according to the invention.

In the embodiment shown in FIG. 7, the disc 70 comprises several helical turns 71 symmetrical about axis 73 of a flattened and curved braid 72 formed of tows 12 of OPF which are thereafter needlepunched together. When finished, disc 70 is very similar in appearance to that of disc 10 illustrated in FIG. 1. One or more additional helically wound braided tapes may be arranged to form a flat, hollow annulus having a plurality of interleaved braided filamentary layers prior to needlepunching. The braided tape may be formed by collapsing a helical hollow tubular braid. As shown in ghost lines in FIG. 7, an additional helical flattened braid 76 may be interleaved with helical turns 71 of braid 72.

Figure 2:
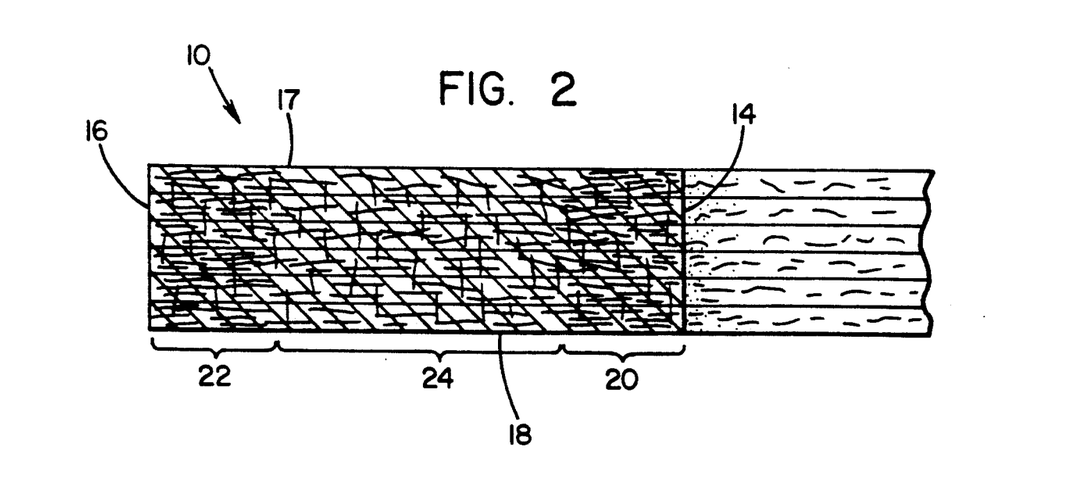
FIG. 2 is an enlarged sectional view taken along plane 2—2' of FIG. 1, depicting schematically the fiber distribution therein.
Figure 5:
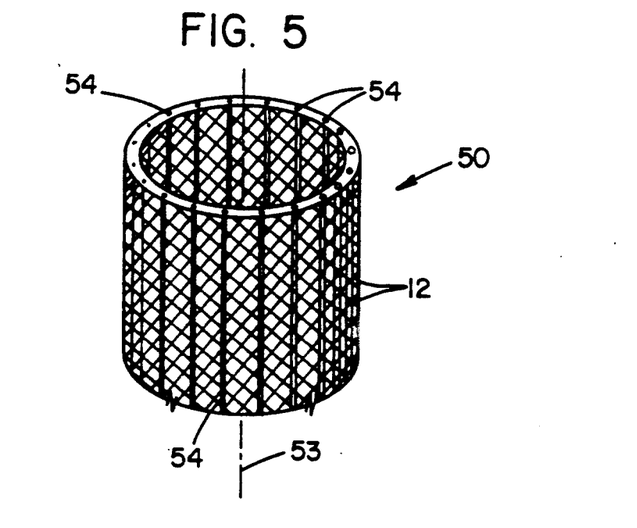
FIG. 5 is an elevational schematic view of a tubular braided structure having a braid angle α.
Figure 6:
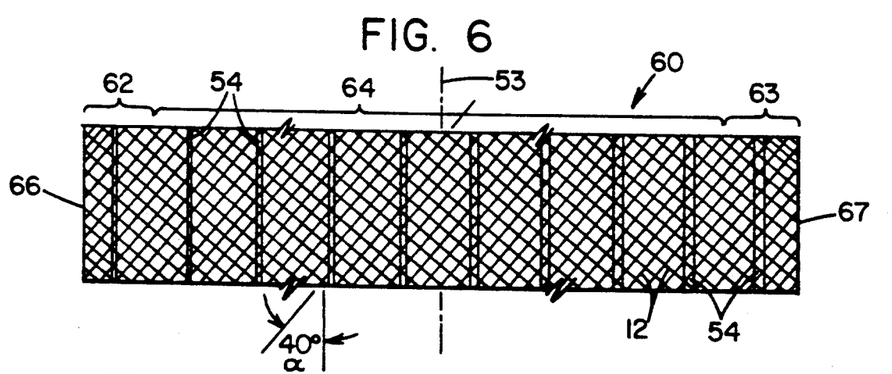
FIG. 6 is a plan view of a flattened tubular braided structure having a braid angle α of 40 degrees.
Figure 6A:
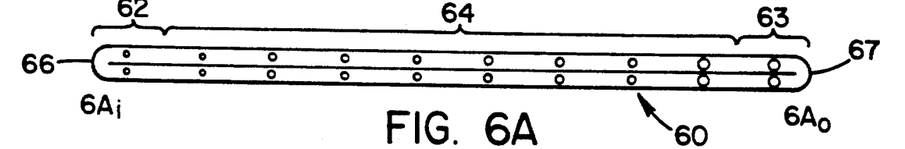
FIG. 6A is a sectional view taken along plane 6A$_i$.—6A$_o$ of FIG. 7.

As shown in FIG. 2, the fiber volume, i.e., the quantity of fiber per unit volume which is usually expressed as a percentage with zero percent meaning that no fiber is present and 100 percent meaning that only fiber is present, is greater in region 20 which is located adjacent the inner periphery 14 of disc 10 and in region 22 which is located adjacent the outer periphery 16 of disc 10 than in central region 24 which is located between regions 20 and 22. This variation in fiber volume is a natural result of forming an otherwise uniform straight tubular braid such as braid 50 shown in FIG. 5 into a flattened annulus. As the tubular braid 50 is flattened to form flattened braid 60 shown in FIG. 6, which is a double thickness fabric strip as shown in FIG. 6A, folded back regions 62, 63 inherently occur at the respective lengthwise extending edges 66, 67 of the flattened braid 60. Each such folded back region 62, 63 has a higher fiber volume than in the central region 64 between such respective folded back edges 66, 67. Also, when a straight braid such as braid 50 or flattened braid 60 is curved into an annulus or arcuate portion thereof, the members forming the braid are forced closer together adjacent the inner periphery of the annulus and pulled apart adjacent the outer periphery of the annulus relative to the central region of the annulus. This deviation in fiber volume can be minimized by braiding techniques hereinafter described.

In preferred embodiments, in addition to the braiding members which extend in helical paths, a system of longitudinal members are introduced into the braid as it is formed. These longitudinal members may be referred to as "unidirectionals". These unidirectionals improve the dimensional stability as well as the tensile and compressive strengths and moduli of the braided fabric. Unidirectionals are typically introduced from stationary guide eyes in the braiding machine such that the unidirectionals will lie straight (without crimp) parallel to the braid axis (longitudinal direction of the braid) while the helical braid members introduced by the braiding machine carriers pass over and under them as the braided fabric is formed.

Figure 6B:
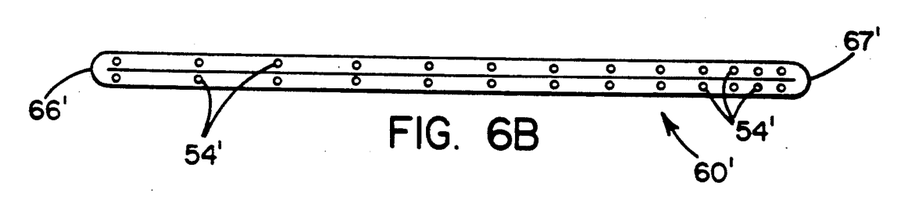
FIG. 6B is a sectional view of an alternate embodiment of a flattened tubular braid containing longitudinals which are unequally spaced apart from one another.

Having reference to FIG. 6A, flattened braid 60 includes unidirectionals 54 which vary in size in a progressively increasing manner from folded back region 62 toward folded back region 63, thereby compensating for the deviation in fiber volume which otherwise inherently occurs as a uniform straight tubular braid is flattened and curved to form an annulus having region 62 adjacent the ID of the annulus and region 63 adjacent the OD of the annulus. While a smooth progression in size is shown in FIG. 6A, it is also within the invention to use an array in which all of the unidirectionals are of the same size but their spacing is varied in a predetermined manner as they are introduced into the tubular braid as it is being formed. As shown in FIG. 6B, unidirectionals 54' of flattened tubular braid 60' are spaced apart from one another in varying manner from inside edge 66' toward outside edge 67', with the unidirectionals 54' being progressively more closely spaced apart from one another as outside edge 67' is approached from the direction of inside edge 66'. It is also within the invention to concurrently employ variations in size, spacing, tension and material of the array of unidirectionals. The unidirectionals may be of different material than the members introduced by the carriers of the braiding machine.

METHOD OF MANUFACTURE

A plurality of tows 12 are loaded onto a conventional braiding machine (not illustrated). A Maypole-type braiding machine, such as that available from Wardwell Braiding Machine, of R.I., U.S.A., is believed to be suitable. A simplified version of a conventional Maypole-type braiding machine and its operation are illustrated in U.S. Pat. No. 3,007,497 to Shobert. The tows 12 should be tightly wound into uniform packages for use in braiding. Due to the curved nature of the annular shape, i.e. a brake disc such as friction disc 10 to be formed, there inherently occurs a deviation in tow count and correspondingly in fiber quantity per unit area with fiber volume being greatest at the inner periphery 14 and least at the outer periphery 16 of disc 10. The term "count" as used herein in reference to fibrous elements such as tows or yarns forming a fabric means the number of fibrous elements per lineal inch measured perpendicular to the longitudinal direction of the fibrous elements. It is believed that the braid angle of the tows may range from 30 to 50 degrees and is varied based on the number of braid carriers employed, the desired fiber volume, the dimensions of the friction disc to be formed, and thus the dimension or diameter of the hollow tubular braid to be formed prior to flattening and curving it into the shape of the friction disc being formed. When using a rigid, straight, cylindrical, non-rotatable mandrel (as is normal practice when forming a uniform tubular braid), the braid angle is preferably about 40 degrees.

As used herein, the term "braid angle" and related forms means the acute angle defined by the tangent to the helix relative to the longitudinal axis of the tubular braid being formed. As illustrated in FIG. 5, tubular braid 50 formed of tows 12 is symmetrical about its longitudinal or braid axis 53. As shown in FIG. 6, tubular braid 50 has a braid angle $\alpha$ of 40°. One repeat of the braid pattern measured along the braid axis 53 is called a "plait". For given braiding members (e.g. 12k OPF tows), the plait spacing determines the angle $2\alpha$ between two opposite helical sense sets of members of a braid. For a tubular braid having a take-up length of the braid per braid repeat of r and a braid circumference of s, the following relationship can be established:

$$\alpha = \tan^{-1}(s/r)$$

which is equivalent to the standard description of helical angles where the repeat length is equivalent to the cycle length of a helix.

A braided tape, such as flattened tubular braid tape 60 shown in FIGS. 6 and 6A or tape 60' shown in FIG. 6B, of a width corresponding to that of the filamentary structure to be formed is produced. The tape is curved into the shape of the desired preform. Where it is desired to produce a friction disc, the tape is formed into an annulus by curving it around a circular shaped center mold such as center mold 91 shown in FIG. 9. In this instance, the braided tape is of a width generally corresponding to the radial distance between the inside diameter periphery and the outside diameter periphery of the annulus.

Figure 3:
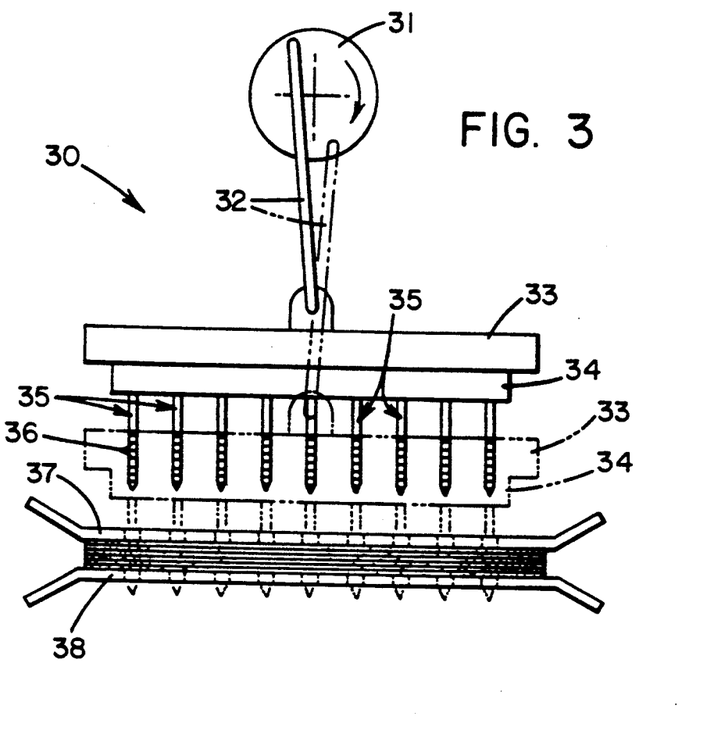
FIG. 3 is an elevational schematic view of a needle loom.
Figure 4:
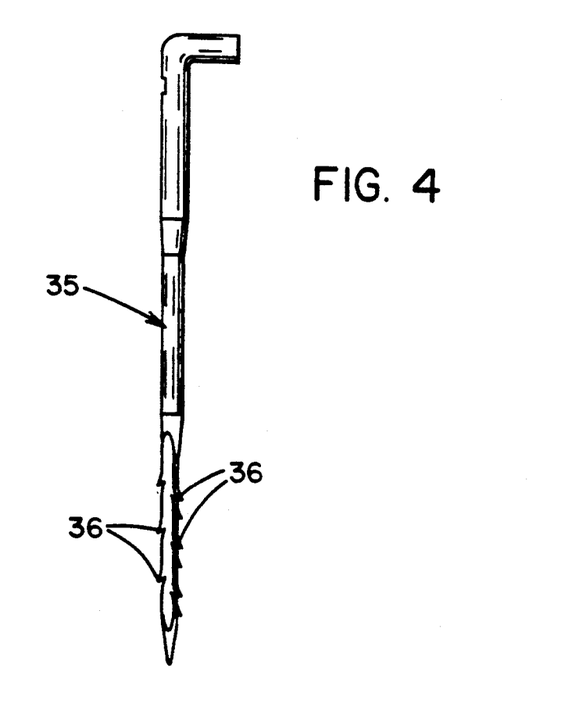
FIG. 4 is an enlarged schematic depiction of a representative needle used in the needle loom of FIG. 3.

One or more layers of a flattened tubular braid are joined to one another and/or to one or more other filamentary layers superposed thereon by needlepunching. This may be accomplished by passing the superposed layers through a conventional needlepunch loom such as needlepunch loom 30 illustrated schematically in FIG. 3. Loom 30 includes rotatable crank 31, connecting rod 32, reciprocable platen 33, needle board 34, needles 35, stripper plate 37, and bed plate 38. Rotation of crank 31 effects reciprocating motion of platen 33, causing needles 35 of needleboard 34 to reciprocally move through stripper plate 37 toward and away from bed plate 38. The fibrous layers to be joined are passed between stripper plate 37 and bed plate 38 while reciprocating motion of the needleboard 34 causes needles 35 to penetrate the fibrous layers. The barbs 36 of needles 35 effect cross-linking of the layers by displacing filaments out of the layers in a direction generally perpendicular to the faces of the layers.

In the following examples embodiments of carbon-carbon friction discs according to the invention and their preparation according to the invention are described. The invention, however, is not to be construed as being limited to the particular embodiments set forth in the following examples.

EXAMPLE 1

A small braided brake disc was made as follows. 12K OPF tow, having a density of about 1.36 to 1.38 grams per cubic centimeter and a twist of about one-half turn per inch was wound onto conventional braider letoff packages which may be referred to as "cops" or "tubes". These tow laden tubes were loaded into all carriers of a 144 carrier braiding machine arranged to produce a 2×2 regular braid, and braided at a forty (40) degree braid angle onto a straight tubular mandrel having an outside circumference of about thirteen (13) inches. No unidirectionals were provided when setting up the braiding machine. The straight tubular braided structure was pulled off the stub braiding mandrel, manually collapsed into a tape of about 6½ inches in width, and formed without any mold or guide device into a crude, flat annulus having an inside diameter ("ID") of about fifteen (15) inches and an outside diameter ("OD") of about twenty-eight (28) inches and a thickness of approximately 0.14 to 0.16 inch. This annular structure was then subjected to needlepunching. The resulting multi-layer (four flattened tubular braids providing a total of eight fabric layers—each tubular braid contributes two fabric layers except at the ID and the OD where the braid turns back upon itself) needlepunched structure had a thickness of about 0.44 inch and a bulk density of about 0.72 g/cc. After needlepunching, which caused the annular braided structure to increase in area, especially in diameter, the part was die cut to provide an annular preform disc of 12.2 inches ID and 23.4 inches OD. This preform disc was thereafter subjected to conventional CVD carbon densification to 1.29 g/cc and thereafter machined. Examination of a cross section of the densified braided needlepunched structure revealed interlaminar non-uniformities. It is believed these non-uniformities could be reduced by further optimization of the needlepunching process, e.g., employment of more aggressive felting needles or needlepunching for a longer period prior to CVD densification.

EXAMPLE 2

12K OPF tow having a density of about 1.36 to 1.38 g/cc, and a slight twist of about one-half turn per inch, was wound tightly onto conventional braider letoff packages. These tow laden cops were loaded onto each carrier of a Wardwell horizontal braider having 144 carriers as were 72 additional unidirectionals letoff packages. The braider was arranged to produce a 2×2 regular braid. The braid angle was set to be forty (40) degrees. Tension of all of the carriers was set to the same value throughout the braiding operation. As the braid was formed, it was pulled off the straight tubular braiding mandrel which had a diameter of about five (5) inches. As the tubular braid was pulled off the mandrel, it was manually flattened and coiled into a continuous helical tape onto a turntable having an OD generally corresponding to that of the friction disc to be made therefrom, in this case about twenty-four (24) inches. The resulting annular braided structure had an ID of nine (9) inches and an OD of twenty-four (24) inches. The helically coiled braided structure was converted into a preform disc as follows.

Figure 9:
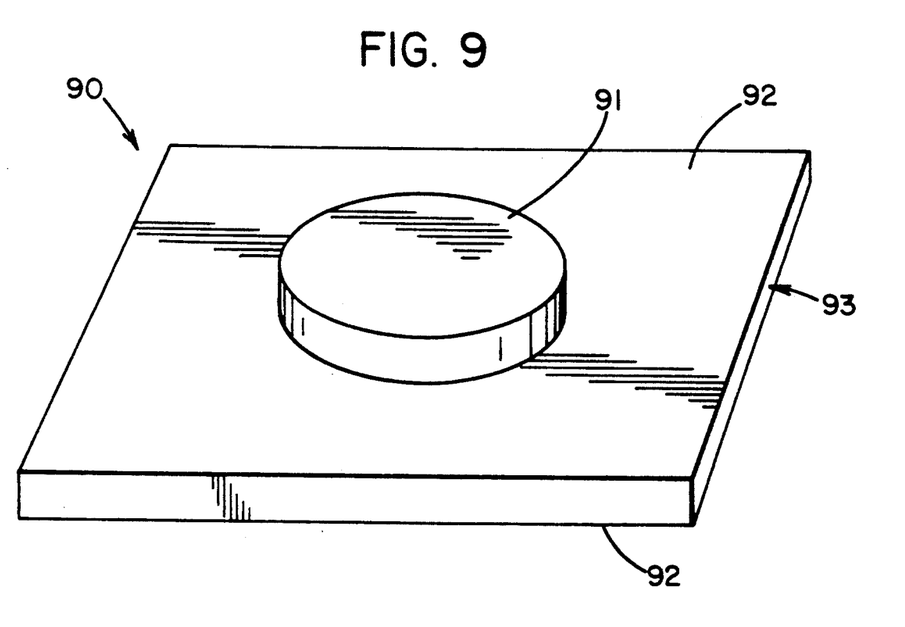
FIG. 9 is an isometric view of a supporting jig useful in practicing the invention.

A supporting jig 90 similar to that shown in FIG. 9 was fabricated. This jig 90 was utilized in needlepunching together the helically wound layers of braided tows. Briefly, the jig 90 comprises an annular center mold 91 secured to one of the large flat surfaces 92 of a flat transport board 93. The transport board 93 is used to enable passing helically wound layers of braided tows through a conventional needlepunching loom such as that illustrated in FIG. 3. The center mold 91 keeps the braided layers from being excessively distorted while needlepunching.

A suitable transport board 93 may be fabricated by needlepunching together a plurality of layers of PAN or OPF tow material or equivalent. The transport board must provide a dimensionally stable, firm support for the braided layers as they are passed through the needlepunch loom. The transport board must be of a thickness and composition which may be penetrated by the needles of the needlepunch loom without damage to them. A transport board having a total thickness of about ⅛ inch formed of layers of PAN or OPF tows has been found to have adequate stiffness and other properties for the preparation of braided shaped filamentary structures according to the invention. An annular center mold 91 having a diameter slightly less than that of the friction disc to be manufactured and a thickness of about ⅜ inch was attached to the transport board to complete the needlepunching jig. The center mold 91 may be formed of neoprene elastomeric material, needlepunched layers of PAN or OPF tow or equivalent material. The center mold 91 may be attached to the transport board 93 with a suitable adhesive such as Camie 363 Fastac available from Camie-Campbell, Inc. of St. Louis, Mo. If the center mold 91 is formed of fibrous material, it may be attached to the transport board 93 by needlepunching. The thickness of the center mold 91 was approximately that of two turns of flattened tubular braid. The integrity of the braided friction disc preform being manufactured was maintained by the jig 90 during needlepunching thereby preventing excessive distortion of the annulus during needlepunching. The jig 90 was needed to enable controlled passage of preform being manufactured through a conventional needle loom whose feed mechanism includes powered rollers at its inlet and outlet.

A length of flattened tubular braid sufficient to encircle the center mold was cut and laid out on the transport board around the center mold in a circular manner with a slight overlap of the braid ends. A slight overlap of the ends of the tubular braid first applied to the transport board is provided to ensure that the ends of the braid do not separate during initial needlepunching of the developing preform structure. Upon passage of the developing preform structure through the needlepunch loom, movement and deformation occur which tend to cause the part being needlepuched to become egg-shaped due to elongation in the direction of passage. Use of jig 90 minimizes such undesired movement and deformation. Less movement and deformation of the developing preform structure occurs as subsequently added annular braided layers are joined by needlepunching. An end of the flattened tubular braid was indexed relative to a point on the center mold or transport board and thereafter the jig and annular braid layer was passed through the needlepunch loom. The needlepunch loom stroke was adjusted to cause the needles to partially penetrate transport board, e.g., about ¼ inch and lightly needle the layers of the annular flattened tubular braid to itself while lightly tacking it to the transport board. Excessive needling at this step is to be avoided because this will result in the braid being securely bound to the transport board from which it must later be removed. After this first pass through the needle loom, the braided annulus was rotated ninety (90) degrees with reference to zero index position and again passed through the needle loom in the opposite direction using standard needlepunching procedures.

Thereafter, a second annular flattened tubular braid was placed upon the first. The ends of this second flattened tubular braid were indexed relative to the ends of the first flattened tubular braid by sixty (60) degrees from the spliced area of the first braid. The ends of the second flattened tubular braid were abutted. Overlapping of the second and any subsequently added annular braid layers is unnecessary because less movement occurs during needlepunching of these. The indexing direction was consistent throughout fabrication to assure proper relative relationship of the braided layers and, i.e., to avoid stacking of their abutted ends. The bed plate of the needlepunch loom was lowered an amount such that the needles penetrated into the first annular flattened tubular braid but did not penetrate the transport board beneath the first annular flattened tubular braid. The assembly was passed through the needlepunch loom three times with rotation of the annulus being formed relative to the board ninety (90) degrees prior to each needlepunch loom pass without adding additional braided material. Standard needlepunching equipment and procedures were employed.

Additional annular flattened tubular braided layers were added one at a time, each having a butt splice indexed 60 degrees from that of the preceding underlying layer. Following the addition of each annular braided layer, the assembly was passed through the needlepunch loom three times with ninety (90) degrees rotation prior to each pass after the first. The bed plate was lowered as each additional layer of braided material was added to compensate for the added thickness of the preform disc being formed.

After the addition of several flattened tubular braided layers, e.g., about 5 or 6, the braided needlepunched structure was observed to have a material thickness profile relative to the upper supporting surface 92 of the transport board 93 that was building up faster adjacent the ID of the preform than its OD. This was due to the inherent slight nonuniformity of the circumferentially uniform tubular braid as it was flattened and forced from a straight to a annular shape. To accommodate this nonplanar buildup, the stripper plate of the needlepunch loom was raised in addition to lowering the bed plate.

Upon reaching the desired thickness through the addition of further flattened helical tubular braided layers, the preform was flipped over and passed twice more through the needlepunch loom with ninety (90) degrees rotation after each pass. Thereafter, the preform was flipped back to its position prior to flipping and subjected to two additional needlepunching passes without addition of further material. As before, the preform was rotated between successive needlepunch loom passes. The preform was thereafter removed from the transport board. The preform typically was slightly distorted or elongated from its desired annular configuration and dimensions. A concentric preform such as preform 80 shown in FIG. 8 was cut therefrom by hydraulic die technique in conventional manner. A water jet cutter is also believed to be suitable. The upper surface 81 of preform 80 is bowed somewhat due to the nonuniformity inherent in curving an otherwise uniform straight flattened tubular braid. The lower surface 82 of preform 80 is flat due to its having been in supporting contact with transport board surface 92. The jig 90 described in Example 2 may be reused. In the event the transport board 93 becomes compressed through use, additional layers of PAN or OPF or other suitable material may be added. If the center mold 91 becomes spongy after repeated passes through the needlepunch loom, e.g., in the case of neoprene or, e.g., in the case where it is formed of fibrous material it should be replaced with a new center mold.

The braided preform being manufactured was subjected to needlepunching using needles at a rate of about 100 to 110 strokes per square centimeter per pass through the needle loom. The needles employed throughout this Example 2 were $15 \times 18 \times 36 \times 3.5$ C333 G 1002 from Groz-Beckert of Germany.

Figure 8:
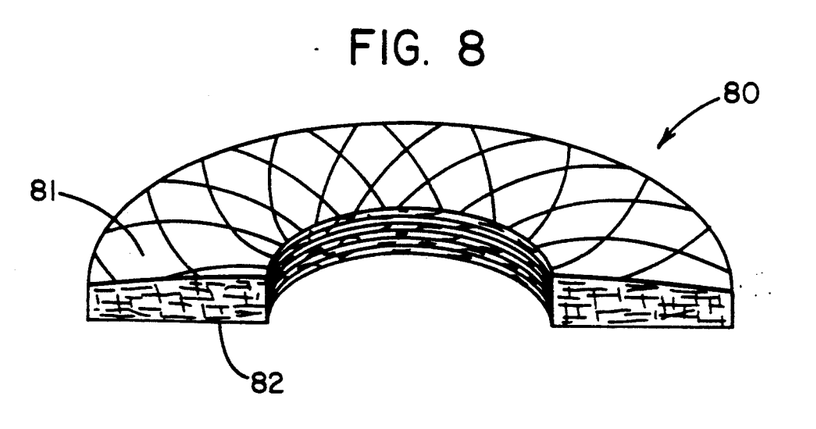
FIG. 8 is an elevational view in section of an embodiment of a braided needlepunched structure according to the invention.

Examination of the resulting braided needlepunched structure 80 indicated a greater thickness and density at the ID relative to the OD as shown in FIG. 8. The structure 80 appeared uniform about its circumference. The needlepunched structure 80 was hard, rigid and had a density adjacent its ID of 0.72 g/cc and its OD of 0.63 g/cc. The braided needlepunched structure 80 was thereafter subjected to CVD densification in conventional manner to produce a friction disc similar in appearance to disc 10 shown in FIG. 1 having an average or bulk density of 1.82 g/cc with a density of about 1.84 g/cc adjacent its ID periphery and about 1.79 g/cc adjacent its OD periphery. As used herein "density" is determined by weighing a specimen of known dimensions, such as that obtained by machining from the region of interest of a larger specimen, and is expressed as weight per unit volume, e.g., g/cc. As used herein "bulk density" is the weight per unit volume of the entire specimen and is normally expressed as g/cc.

A plurality of such densified discs made according to this Example 2 were machined in conventional manner and assembled to form a multi-disc brake similar to that shown and described in any of U.S. Pat. Nos. 4,018,482; 4,878,563; and 4,613,017. Dynamometer testing indicated that friction discs made according to this Example 2 exhibited strength and wear characteristics at least equal to, and friction characteristics somewhat less than, those of commercially available friction disc structures available from The B. F. Goodrich Company under the brand name SuperCarb TM and those available from Carbone Industrie and Messier Bugatti, both of France, under the brand name SEPCARB ®.

For a final machined friction disc of 1.2 inches thickness, a preform having an appearance like that shown in FIG. 8 of about 1.8 thickness inches was prepared. Shrinkage of about 10 to 15 percent occurs during conversion in known manner of the OPF to carbon fiber.

It is believed that a helical continuous flattened braid and hence friction disc preform having greater uniformity of fiber volume from its ID to its OD can be made by introduction of unidirectionals during formation of the tubular braid. Use of unidirectionals is beneficial for at least three reasons. First, the resulting braid compared to the same braid without unidirectionals is of higher dimensional stability and is thus easier to handle during manufacturing operations, especially needlepunching. Second, unidirectionals permit compensation for the ID to OD fiber volume variation that inherently arises when the straight braid is curved. The curving action increases the fiber volume adjacent the ID and decreases the fiber volume adjacent the OD of the braid. Utilization of unidirectionals of various sizes in forming the braid, with the size of the unidirectionals progressively increasing in that circumferential portion of the tubular braid which corresponds toward the outside diameter periphery of the annulus can reduce the variation in fiber volume that otherwise occurs. This enables near uniform mechanical properties to be obtained throughout the resultant needlepunched structure or to intentionally design in specific nonuniformities. An example of the latter is the introduction of extra circumferentially extending fibers adjacent the ID and the OD to tailor the mechanical properties of those regions to resist the forces encountered where the later-machined notches of a friction disc engage corresponding splines of a clutch or brake mechanism. Third, the unidirectionals can be of different materials than are used for the remainder of the members forming the braid to benefit final mechanical or other properties of the needlepunched and densified structure. These latter materials could include other carbon-based and/or ceramic-based fibers. Curving of the straight braid containing unidirectionals not only affects fiber volume, but also creates convolutions because of the differential tension between the ID and OD unidirectionals. These nonuniformities include bunching, span width shrinkage and other related distortions. Differential tension control of the unidirectionals as they are introduced into the braid can help to reduce distortion of the resultant curved flattened braided tape. Those unidirectionals which correspond to that region of the tubular braid being formed which when flattened will become the outside diameter (OD) portion of the friction disc are introduced at lower letoff tension than the unidirectionals which correspond to that region of the tubular braid being formed which will become the inside diameter (ID) portion of the friction disc being formed. The letoff tension of the unidirectionals may be progressively increased from the region corresponding to the ID of the curved flattened braid being formed toward the OD of the curved flattened braid being formed.

Fibers such as cotton or rayon or fugitive fibers such as polyester fibers may be introduced during manufacture to enhance processabilty. As used herein, the term "fugitive" refers to materials which are removed or destroyed during subsequent processing, such as by solvent extraction or melting or thermal degradation, e.g. during subsequent furnacing of the friction disc being made. Cotton and rayon fibers are not considered fugitive because there remains a carbon fiber char upon furnacing. Cotton and rayon fibers are considered to be among "precursors of carbon fibers". It is believed that in certain preferred embodiments that such cellulosic or fugitive fibers may be blended with staple OPF to form blended yarns to be used in forming unidirectionals. The use of such blended staple fiber yarns is expected to facilitate manufacture of unidirectionals of varying size and/or other properties dependent upon the properties of the constituent staple fibers. Recycled or virgin OPF staple may be used in the manufacture of yarns to be formed into the braided fabric to be used in manufacture of shaped filamentary structures of the invention.

It is believed that a helical continuous flattened braid and hence friction disc preform having greater uniformity of fiber volume from its ID to its OD can be made by varying the tow letoff tension of the braider carriers dependent upon position of the package on the Maypole type braider relative to a reference position of the braider deck about which the carriers rotate during braiding. It is believed that this natural nonuniformity may be reduced somewhat by varying in a controlled manner the tension of the individual packages of tow installed on the braider according to the rotational position of the package on the braider relative to a reference rotational position of the braider carrier deck. In other words, the tension of each braider carrier package is varied as the braider operates such that the region of the tubular braid being formed which when flattened will become the OD portion of the brake disc is reduced in tension compared to when the same tows pass through that region of the tubular braid being formed which will become the ID portion of the brake disc being formed.

It is preferred that the tows be of PAN fiber in its oxidized state (OPF) when subjected to all textile processes described herein. While it may be possible to produce suitable preform discs out of greige PAN fiber and thereafter oxidize such preforms in a batch method as opposed to the continuous oxidation method employed in the manufacture of oxidized PAN fiber, this is not deemed most economical, particularly because prior to oxidation the PAN fiber does not have the desired high density nor is it able to withstand the high temperature of the furnace cycles desired to be employed subsequent to formation of the preform disc.

While the invention is illustrated using tapes of flattened tubular braids, each of which provides two fabric layers except at its lengthwise extending edges, it is also within the invention to use a flat braid or use a tape formed by slitting lengthwise a tubular braid to form a tape having a single fabric layer rather than two fabric layers.

It is also believed possible, although not preferred, to employ carbonized tow. The carbonized 12K tow may have a higher density compared to OPF including but not limited to 1.74 to 1.78 g/cc. Disc preforms made of such carbonized tow may have a higher density at the time of entering the subsequent furnace cycles and thus may be expected to require less initial time in such subsequent furnace cycles, but could be more difficult to densify to a desired final density in the range of about 1.79 g/cc to about 1.85 g/cc. Due to the conductive nature of such carbonized tows, electrical components of such machinery must be sealed in a manner to prevent conductive particulate matter from the tows from shorting out such electrical equipment. Machinery of this type including braiders and needlepunching looms is commercially available.

While the invention has been described with reference to the use of tow, it is within the invention to use yarn formed of continuous filaments or staple fibers or blends of these in place of tow for any of the braiding members and any of the unidirectonals.

What is claimed is:

1. A method of producing a near net shape filamentary structure having a width comprising the steps of forming a braided filamentary tape of a width generally corresponding to the width of the filamentary structure to be formed; superposing at least one filamentary layer on a layer of such braided filamentary tape; needlepunching the superposed layers to produce cross-linking of the layers by filaments displaced out of the layers and extending in a direction generally perpendicular to the faces of the layers.

2. The method of claim 1 further comprising the steps of superposing at least one layer of braided filamentary tape on another braided filamentary layer; needlepunching the superposed layers to produce cross-linking of the layers by filaments displaced out of the layers and extending in a direction generally perpendicular to the faces of the layers.

3. The method of claim 1, further comprising forming the braided tape as a tubular braid and introducing unidirectionals into the braid as it is being formed.

4. A method of producing a near net shape hollow flat annular filamentary structure comprising the steps of forming a braided filamentary tape of a width generally corresponding to the radial distance between the inside diameter periphery and the outside diameter periphery of the annular structure to be formed; superposing at least one filamentary layer on a layer of said braided filamentary tape; needlepunching the superposed layers to produce cross-linking of the layers by filaments displaced out of the layers and extending in a direction generally perpendicular to the faces of the layers.

5. The method of claim 4, further comprising helically winding the braided tape to form an annulus of superposed braided filamentary layers.

6. The method of claim 5, further comprising forming the braided tape as a tubular braid, further comprising introducing unidirectionals into the braid as it is being formed.

7. The method of claim 6, further comprising differentially controlling the tension of the undirectionals as they are formed into the helical braid.

8. The method of claim 7, further comprising reducing distortion of the braided tape by differential tension control of the unidirectionals.

9. The method of claim 6, further comprising varying the size of the unidirectionals in a progressively increasing manner toward the outside diameter periphery of the annulus.

10. The method of claim 6, further comprising varying the spacing of the unidirectionals in a predetermined manner as they are introduced into the braid.

11. The method of claim 5, further comprising maintaining the fiber volume generally uniform between adjacent the inside diameter periphery and adjacent the outside diameter periphery of the annulus.

12. The method of claim 3, wherein the structure to be formed has a flat arcuate shape having a width corresponding to the radial distance between the inside periphery and the outside periphery of the arcuate shape, further comprising forming the braided tape of a width generally corresponding to the radial distance between the inside diameter periphery and the outside diameter periphery of the flat arcuate shape.

13. The method of claim 4, further comprising forming the braided tape by collapsing a helical hollow tubular braid.

14. The method of claim 5, wherein a plurality of braided tapes are concurrently helically wound to form an annulus of superposed interleaved braided filamentary layers prior to needlepunching.

15. The method of claim 1 wherein the braided tape is formed from yarns from the group consisting of PAN fibers including OPF, carbon fibers, graphite fibers, ceramic fibers, precursors of carbon fibers and precursor of ceramic fibers, and mixtures of these.

16. The method of claim 9 wherein the braided tape is formed from yarns from the group consisting of PAN fibers including OPF, carbon fibers, graphite fibers, ceramic fibers, precursors of carbon fibers and precursor of ceramic fibers, and mixtures of these.

17. The method of claim 1, further including binding together the cross-linked layers by a matrix selected from the group consisting of carbon, ceramic, precursor of carbon, precursor of ceramic, and mixtures of these.

18. A shaped filamentary structure having a width, the structure comprising at least a first braided filamentary tape layer of a width generally corresponding to the width of the filamentary structure to be formed superposed upon and joined to least one other filamentary layer by needlepunching to produce cross-linking of the layers by filaments displaced out of the layers and extending in a direction generally perpendicular to the faces of the layers.

19. The structure of claim 18, wherein said filamentary layer is a braided filamentary layer.

20. The structure of claim 18, wherein the braided tape is formed from yarns from the group consisting of PAN fibers including OPF, carbon fibers, graphite fibers, ceramic fibers, precursors of carbon fibers and precursor of ceramic fibers, and mixtures of these, further including a matrix selected from the group consisting of carbon, ceramic, precursor of carbon, precursor of ceramic, and mixtures of these binding the filaments.

21. The structure of claim 18, having a generally flat, hollow annular shape whose width is defined as the radial distance between the inside diameter periphery and the outside diameter periphery of the annular shape, in which the braided layer extends circumferentially, the width of the braided layer generally corresponding to the radial distance between the inside diameter periphery and the outside diameter periphery of the annular structure.

22. The structure of claim 18, further including a plurality of helically wound braided tapes arranged to form a flat, hollow annulus having plurality of interleaved braided layers.

23. The structure of claim 21, further including a plurality of helically wound braided tape layers arranged to form a flat, hollow annulus having plurality of interleaved braided layers.

24. The structure of claim 23, wherein the braided tapes are formed from yarns from the group consisting of PAN fibers including OPF, carbon fibers, graphite fibers, ceramic fibers, precursors of carbon fibers and precursor of ceramic fibers, and mixtures of these, further including a matrix selected from the group consisting of carbon, ceramic, precursor of carbon, precursor of ceramic, and mixtures of these binding the filaments of the braided tapes.

25. The structure of claim 18, having a flat, arcuate shape whose width is defined as the radial distance between the inner periphery and the outer periphery of the arcuate structure, the structure having substantially uniform fiber volume from adjacent the inner periphery to adjacent the outer periphery.

26. The structure of claim 18, wherein the braided tape layer is a flattened tubular braid including unidirectionals.

* * * * *